Patented Feb. 25, 1936

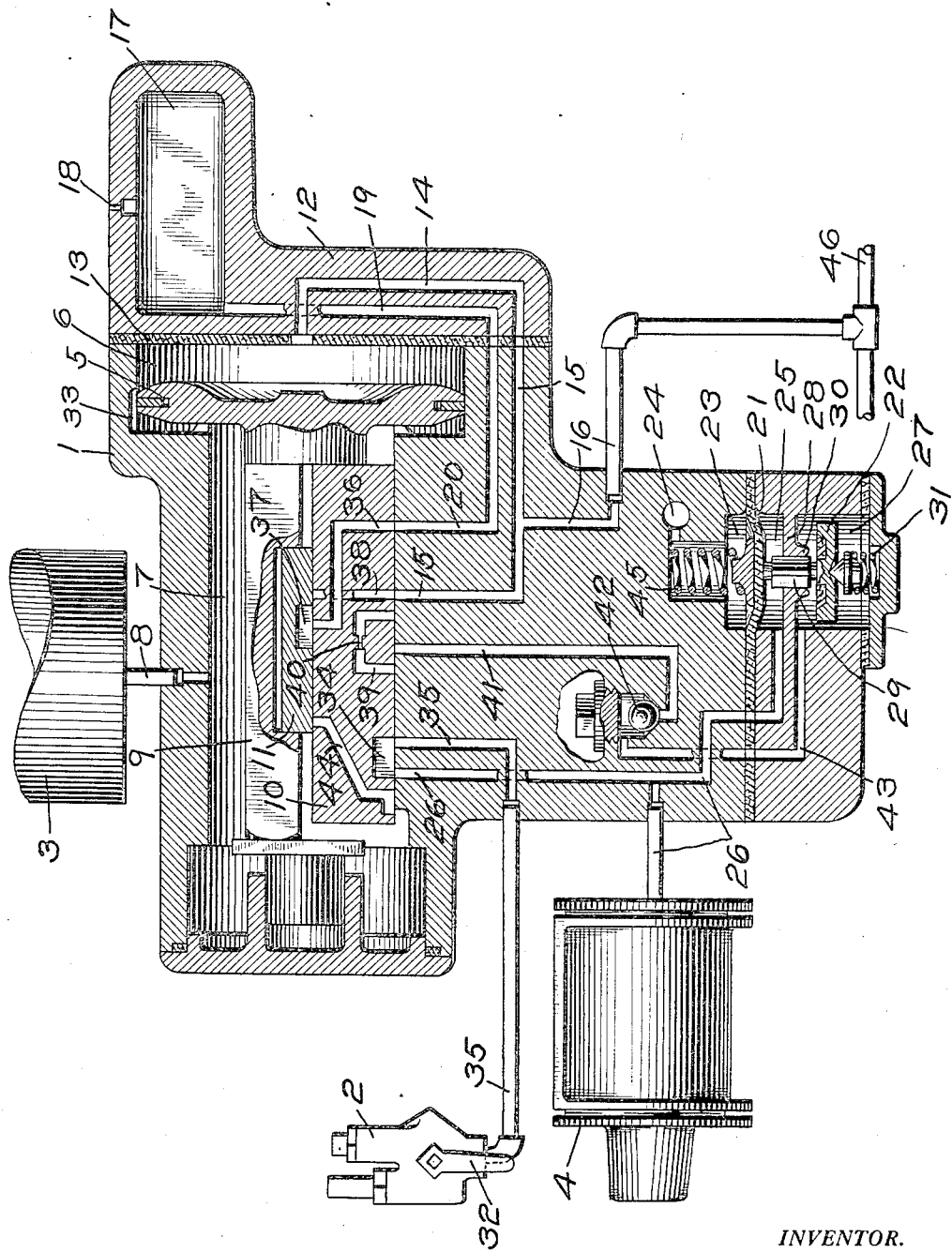

2,032,144

UNITED STATES PATENT OFFICE 2,032,144

FLUID PRESSURE BRAKE

Claude A. Nelson, Wilmerding, Pa., assignor to The Westinghouse Air Brake Company, Wilmerding, Pa., a corporation of Pennsylvania Application December 1, 1931, Serial No. 578,245

33 Claims. (Cl. 303—39)

This invention relates to fluid pressure brakes, and more particularly to the type adapted to operate upon a reduction in brake pipe pressure to effect an application of the brakes and upon an increase in brake pipe pressure to effect a release of the brakes.

It has heretofore been proposed, as disclosed in the pending application of Ellis E. Hewitt, filed June 20, 1931, Serial No. 545,647, to provide a quick service bulb or reservoir on each car in a train for serially effecting a local quick service reduction in brake pipe pressure for causing the brake controlling valve devices in the front and rear portions of the train to operate more nearly in synchronism to effect an application of the brakes.

In the above mentioned pending application, when the main slide valve of the triple valve device is in release position, the exhaust passage from the quick service reservoir and the exhaust passage from the brake cylinder are connected to the same release cavity in said slide valve, so that in effecting a release of the brakes, fluid under pressure from the quick service reservoir and from the brake cylinder, exhaust together through the usual retaining valve device. In effecting an application of the brakes, the triple valve piston and auxiliary slide valve are initially moved relative to the main slide valve to a preliminary quick service position for venting fluid under pressure from the brake pipe to the quick service reservoir so as to effect a local quick service reduction in brake pipe pressure for propagating serially the quick service action throughout a train and for moving the triple valve device to service position. It has been found that, if a release of the brakes is attempted immediately upon completing a light reduction in brake pipe pressure, by operation of the usual brake valve device, some of the triple valve devices in the train may still be in the preliminary quick service position and the increase in brake pipe pressure prevents these triple valve devices from moving on to service position as intended. If a triple valve device is thus prevented from moving from preliminary quick serice position to service position, communication is maintained between the brake pipe and quick service reservoir and through the release cavity in the main slide valve to the brake cylinder, and fluid under pressure supplied to the brake pipe will flow through this communication to the brake cylinder. With the retaining valve device turned to the pressure retaining position, this supply of fluid from the brake pipe to the brake cylinder exceeds the venting capacity of the retaining valve device and as a result the brakes are applied. The brakes may thus be applied on several cars in the train so that the train may be unintentionally retarded or brought to a stop, either of which is very undesirable.

One object of my invention is to provide an improved fluid pressure brake equipment of the above type in which the quick service reservoir is vented to the atmosphere independently of the brake cylinder and retaining valve device, so that if the triple valve device becomes stopped in preliminary quick service position connecting the brake pipe to said reservoir, fluid under pressure from the brake pipe, instead of flowing to the brake cylinder, will escape directly to the atmosphere and thereby avoid the above described objectionable condition.

In carrying out this feature of my invention, I restrict the atmospheric vent from the quick service reservoir, so that if the triple valve device does stop in the preliminary quick service position in effecting an application of the brakes, the restricted vent will, in effecting a release of the brakes, prevent the venting of fluid from the brake pipe to the atmosphere at as fast a rate as fluid is supplied to the brake pipe, so that an increase in brake pipe pressure will be obtained to ensure movement of the triple valve device to release position.

Some of the brake controlling valve devices in the train may operate to effect an application of the brakes upon a less reduction in brake pipe pressure than others, and the volume of the brake pipe on different cars varies, so in order to ensure the proper operation of all of the brake controlling valve devices in the train, the volume of the quick service reservoir, heretofore employed, has been large enough to effect a sufficient quick service reduction in the pressure of the brake pipe of maximum volume to ensure the operation of the brake controlling valve devices which require the greater reduction. It will therefore be apparent that the volume of the quick service reservoir heretofore employed has been larger than required under certain conditions.

Another object of my invention is to provide a fluid pressure brake equipment of the above type having improved means for serially propagating quick service action throughout a train without employing a quick service reservoir of large volume.

Another object of my invention is to provide a brake controlling valve device having a quick service reservoir or bulb, preferably associated therewith, of a volume to correspond with a minimum car brake pipe volume, such that a sufficient local reduction in brake pipe pressure will be effected to propagate quick service action from one car of a train to the next serially throughout the train, said reservoir being provided with a restricted vent open to the atmosphere for continuing the reduction in brake pipe pressure so as to ensure movement of the local brake controlling valve device to application position, where the brake controlling valve device fails to move to application position upon substantially equalization of the brake pipe into said reservoir.

Another object of my invention is to provide a fluid pressure brake equipment having improved means operable to effect a local quick service reduction in brake pipe pressure in three stages, the first stage being at a comparatively rapid rate to a quick service reservoir or bulb for the purpose of insuring the prompt propagation of the quick service action from one car of a train to the next car and serially throughout the train; the second stage being at a slower rate for the purpose of insuring the movement of the local brake controlling valve device to application position in the event of the first stage of reduction being insufficient to cause the brake controlling valve device to move to application position; and the third or final stage begins when the brake controlling valve device moves to application position and continues until closed off upon a predetermined increase in brake cylinder pressure and is for the purpose of insuring the brake controlling valve device remaining in application position until the desired brake cylinder pressure is developed.

Another object of my invention is to provide an improved brake controlling valve device having a quick service reservoir preferably associated therewith and provided with a restricted vent leading directly to the atmosphere for releasing fluid under pressure from said reservoir.

By venting the quick service reservoir directly to the atmosphere instead of to the atmosphere through the brake controlling valve device as has been customary, it is possible to make the operating parts of the brake controlling valve device less complicated smaller in size, which in conjunction with a smaller quick service reservoir results in a brake controlling valve device considerably smaller in size than has heretofore been possible with devices of a similar character.

Other objects and advantages will appear in the following more detailed description of my invention.

In the accompanying drawing, the single figure is a diagrammatic view, mainly in section of a fluid pressure brake equipment embodying my invention.

As shown in the drawing, the fluid pressure brake equipment comprises a triple valve or other brake controlling valve device 1, a pressure retaining valve device 2, an auxiliary reservoir 3 and a brake cylinder 4.

The triple valve device 1 comprises a casing containing a piston 5 having at one side a chamber 6 communicating with a brake pipe 46 and having at the other side a valve chamber 7 open to the auxiliary reservoir 3 through a passage and pipe 8. The piston 5 is provided with a stem 9 projecting into valve chamber 7 for operating a main slide valve 10 and an auxiliary slide valve 11.

A cylinder cover 12 is mounted on the triple valve casing for closing the open end of the piston chamber 6, and a gasket 13 is interposed between said cover and casing for effecting a leak-proof seal. A passage 14 is provided in the cover 12 for connecting the piston chamber 6 to a passage 15 in the casing, the passage 15 being connected to the brake pipe 46 through passage and pipe 16. Preferably contained in the cylinder cover 12 is a quick service bulb or reservoir 17 which is open directly to the atmosphere through a restricted passage or choke 18 and is connected by means of a passage 19 in the cylinder cover 12 and passage 20 in the triple valve casing to the seat of the main slide valve 10.

Preferably associated with the triple valve device is a quick service modifying valve device comprising a flexible diaphragm 21, and a poppet valve 22 adapted to be controlled in accordance with the operation of said diaphragm. The diaphragm 21 has at one side a chamber 25 open through passage and pipe 26 to the brake cylinder 4 and at the other side a chamber 23 open to the atmosphere through an atmospheric port 24 and containing a control spring 45 for deflecting said diaphragm to the position shown in the drawing. The poppet valve 22 is contained in a chamber 27 which is separated from chamber 25 by means of a partition wall 28. The wall 28 is provided with a bore in which is slidably disposed a fluted operating pin 29 operatively connecting the diaphragm 21 and valve 22, and surrounding said bore is a seat rib 30 adapted to be engaged by said valve. A spring 31 is provided in valve chamber 27 for holding said valve in engagement with the operating pin 29 and is adapted to urge said valve into engagement with seat rib 30 upon deflection of the diaphragm 21, as will be hereinafter fully described.

The pressure retaining valve device 2 is of the usual construction having a cut-out position in which the handle 32 is carried in a vertical position as shown in the drawing, and a cut-in position in which the handle 32 is carried in a horizontal position. In cut-in position, the retaining valve device is adapted to control the venting of fluid under pressure from the brake cylinder 4 until the brake cylinder pressure is reduced to a predetermined degree, at which time the retaining valve device is adapted to operate to hold the remaining fluid under pressure in the brake cylinder in the usual well known manner. In the cut-out position, the retaining valve device is ineffective to control the venting of fluid under pressure from the brake cylinder 4, and until otherwise specified, the retaining valve device will be considered in the cut-out position.

In operation, to initially charge the brake equipment, fluid under pressure is supplied to the brake pipe 46 in the usual manner and from thence flows through pipe and passage 16, and passages 15 and 14 to the triple valve piston chamber 6. Assuming the triple valve parts to be initially in release position, as shown in the drawing, fluid under pressure flows from piston chamber 6 through a feed groove 33 to valve chamber 7 and from thence through passage and pipe 8 to the auxiliary reservoir 3, thus charging said chamber and the auxiliary reservoir to brake pipe pressure.

With the triple valve slide valve 10 in release position, the brake cylinder 4 is open to the atmosphere through pipe and passage 26, a cavity 34 in said slide valve, passage and pipe 35 and the retaining valves device 2. Since diaphragm chamber 25 is in constant communication with the brake cylinder 4 through passage and pipe 26, said chamber is open to the atmosphere with the brake cylinder 4. This permits spring 45 to hold the diaphragm 21 deflected to the position shown in the drawing. With the diaphragm 21 in the position shown in the drawing, the poppet valve 22 is unseated by the fluted pin 29 and chamber 27 is open to the chamber 25.

The quick service reservoir 17 is normally at atmospheric pressure, being open to the atmosphere through choke 18. Passage 20, which communicates with the quick service reservoir by way of passage 19, registers with a port 36 in the main slide valve 10, the port 36 connecting to a cavity 37 in the auxiliary slide valve 11.

When it is desired to effect a service application of the brakes, a gradual reduction in brake pipe pressure is effected in the usual manner. A corresponding reduction occurs in the piston chamber 6 and when the pressure in said chamber is reduced a predetermined degree below the pressure in valve chamber 7, the piston 5 and auxiliary slide valve 11 are moved toward the right hand to initial quick service position in which the piston stem 9 engages the left hand end of the main slide valve 10.

In initial quick service position, cavity 37 in the auxiliary slide valve 11 connects port 36 in the main slide valve to a port 38. Port 38 registers with passage 15, which communicates through passage and pipe 16 with the brake pipe 46, consequently, fluid under pressure is permitted to flow from the brake pipe through passage 15, port 38 in the main slide valve 10, cavity 37 in the auxiliary slide valve 11, and port 36 in the main slide valve to passage 20 and thence through passage 19 to the quick service reservoir 17. The brake pipe pressure is thus permitted to locally reduce to substantial equalization into the quick service reservoir 17 and this reduction becomes immediately effective in piston chamber 6 on one side of the piston 5 and also causes a reduction to be effected in the corresponding piston chambers of the triple valve device on the next car of the train, so that the piston and thereby the auxiliary slide valve on the latter car will be moved promptly to initial quick service position. Since the triple valve device on each of the other cars of the train functions in substantially the same manner, quick service action is propagated serially throughout the train.

The reduction in brake pipe pressure caused by the substantial equalization of brake pipe pressure into the quick service reservoir, as just described, will vary in accordance with the volume of the brake pipe on a car as governed particularly by the length of the car. Also, the condition of the triple valve devices on a train will vary, so that some will move to service position upon the light reduction in brake pipe pressure as effected by the quick service reservoir 17, whereas others will require a greater reduction in brake pipe pressure to be moved to service position. It will here be understood, however, that this reduction on one car of the train is adequate to move the triple valve device on the next car to initial quick service position.

If the quick service reduction in brake pipe pressure caused by the substantial equalization of brake pipe pressure into the quick service reservoir 17 is sufficient to cause the triple valve device to move to service position, the pressure in valve chamber 7 promptly shifts the piston 5 and slide valves to said position in which said piston engages the gasket 13 and in which passage 20, through which fluid under pressure is vented to the quick service reservoir 17, is lapped by the slide valve 10.

If, however, the triple valve device requires a greater reduction in brake pipe pressure to move it to service position than is obtained by substantial equalization of the pressures in the brake pipe and quick service reservoir 17, then further quick service reduction in brake pipe pressure occurs by the flow of fluid under pressure to the quick service reservoir at a rate governed by the capacity of choke 18 to vent fluid under pressure from said reservoir to the atmosphere. When a sufficient reduction in brake pipe pressure is thus obtained in piston chamber 6, the piston 5 and slide valves 10 and 11 are moved to service position as above described.

In service position of the main slide valve 10, a passage 39, containing a choke 40, in said slide valve, connects the brake pipe passage 15 to a passage 41, so that fluid under pressure is permitted to flow from the brake pipe 46 to passage 41, thence past a check valve 42 and through a passage 43 to the poppet valve chamber 27, and from said chamber past the unseated poppet valve 22 to chamber 25 and thence through passage and pipe 26 to the brake cylinder 4. The quick service venting of fluid under pressure from the brake pipe to the brake cylinder, as just described, is adapted to further hasten the service reduction in brake pipe pressure and insures that the triple valve device remains in service position until a predetermined brake cylinder pressure is obtained. This final quick service is also so controlled by the choke 40 as to tend to smooth out any possible surges in brake pipe pressure which might have been caused by the initial rapid quick service venting into the quick service reservoir 17.

At the same time that fluid under pressure is being vented from the brake pipe to the brake cylinder, fluid under pressure is permitted to flow from the auxiliary reservoir 3 to the brake cylinder 4 by way of valve chamber 7, through the service port 44, which in service position of the main slide valve 10 registers with passage 26, and from passage 26 to the brake cylinder 4.

Since diaphragm chamber 25 of the quick service modifying valve device is at all times in communication with the brake cylinder 4 through passage and pipe 26, fluid at the pressure acting in the brake cylinder also acts in said chamber, so that when a predetermined pressure is obtained in the brake cylinder and in chamber 25, the diaphragm 21 is deflected upwardly against the opposing pressure of spring 45. The upward deflection of diaphragm 21 permits spring 31 to seat poppet valve 22 and prevent further venting of fluid under pressure from the brake pipe to the brake cylinder.

After the poppet valve 22 is seated, fluid under pressure continues to flow from the valve chamber 7 and the connected auxiliary reservoir 3 to the brake cylinder until the pressure in said chamber is reduced to slightly below the brake pipe pressure in chamber 6, at which time the piston 5 is operated to shift the slide valve 11 to service lap position, in which the service port 44 is lapped by the auxiliary slide valve 11 so as to prevent further flow of fluid under pressure to the brake cylinder.

If it is desired to increase the degree of brake application, a further service reduction in brake pipe pressure is effected which causes the triple valve piston 5 and auxiliary slide valve 11 to be shifted from service lap position to service position, in which the service port 44 is uncovered to permit further flow of fluid under pressure from the auxiliary reservoir 3 to the brake cylinder 4. It will here be noted however, that there is no quick service venting of fluid under pressure from the brake pipe after the initial reduction in brake pipe pressure in graduating an application of the brakes as above described, for the reason that the brake cylinder pressure obtained upon the initial reduction in brake pipe pressure is sufficient to maintain the quick service modifying valve diaphragm deflected so that valve 22 is maintained seated.

To effect a release of the brakes after an application, fluid under pressure is supplied to the brake pipe 46 in the usual manner and from the brake pipe flows to piston chamber 6. When the brake pipe pressure in piston chamber 6 is thus increased sufficiently above the reduced auxiliary reservoir pressure in valve chamber 7, the piston 5 is operated and moves the slide valves 10 and 11 to release position, in which fluid under pressure is supplied from chamber 6 through the feed groove 33 to valve chamber 7 and from said chamber to the auxiliary reservoir 3. In the release position of the main slide valve 10, fluid under pressure is vented from the brake cylinder 4 through pipe and passage 26, cavity 34 in said slide valve, passage and pipe 35 and the retaining valve device 2. When the brake cylinder pressure acting in diaphragm chamber 25 of the quick service modifying valve device is reduced, as just described, to a predetermined degree, spring 45 deflects the diaphragm 21 to unseat the poppet valve 22 so as to permit quick service action when another application of the brakes is effected in the manner hereinbefore described.

In controlling a train down a descending grade it is customary to cycle the brakes, or in other words, to effect an application of the brakes in the same manner as hereinbefore described and then after a certain lapse of time to supply fluid under pressure to the brake pipe 6 for moving the triple valve device to release position for recharging the auxiliary reservoir preparatory to effecting the next application of the brakes.

In operating on a descending grade, the retaining valve device 2 is turned to cut-in position so as to control the partial release of fluid under pressure from the brake cylinder and to retain a predetermined pressure in the brake cylinder while the brake system is being charged with fluid under pressure for further applying the brakes upon a subsequent reduction in brake pipe pressure.

The quick service operation during the initial application of the brakes in cycling is the same as hereinbefore described, but the pressure of fluid retained in the brake cylinder by the retaining valve device 2 while recharging the equipment is adapted to maintain the diaphragm 21 deflected so that spring 31 can maintain the poppet valve 22 seated. As a result, in applying the brakes in cycling after the initial application, there is no quick service venting of fluid under pressure from the brake pipe past the poppet valve 22 to the brake cylinder.

As soon as the main slide valve 10 is moved from the release position, shown in the drawing, in effecting an application of the brakes, the pressure in the quick service reservoir 17 reduces through choke 18 to atmospheric pressure, so that in cycling operation, the quick service reservoir 17 is adapted to effect a quick service reduction in brake pipe pressure, in the manner hereinbefore described, upon each application of the brakes.

When it is desired to effect a complete release of the brakes, after cycling operation, the retaining valve device 2 is turned to the cut-out position. Fluid under pressure is supplied to the brake pipe 46 and consequently to the piston chamber 6 for moving the triple valve piston 5 and slide valves 10 and 11 to release position, in which the auxiliary reservoir 3 is charged with fluid under pressure supplied through feed groove 33 to valve chamber 7, and fluid under pressure is released from the brake cylinder 4 through pipe and passage 26, cavity 34 in the slide valve 10, through passage and pipe 35 and the retaining valve device 2.

It will be apparent from the foregoing description that my equipment is capable of functioning to effect a local quick service reduction in brake pipe pressure in three stages after a reduction in brake pipe pressure has been initiated through the medium of the usual brake valve device. The first stage of the local reduction is at a fairly rapid rate to the small quick service reservoir 17, the amount of brake pipe reduction on one car being adequate to insure the movement of the triple valve device on the next car to initial quick service position, thus insuring the prompt propagation of quick service action throughout the train. The second stage of quick service reduction is due to the venting of the fluid from the quick service reservoir 17 to the atmosphere through the choke 18, consequently, a slow venting of fluid from the brake pipe to the atmosphere takes place, so that the brake pipe pressures will be reduced sufficiently to insure movement of the local triple valve device to service position. This second stage of reduction in brake pipe pressure continues until closed off by the main slide valve 10 in its traverse toward service position. The third or final reduction in brake pipe pressure is from the brake pipe to the brake cylinder and is started when the passage 39 in the main slide valve 10 establishes communication from the brake pipe passage 15 to the passage 41 leading to the brake cylinder by way of the quick service modifying valve device. This final reduction continues until closed off by the action of the quick service modifying valve device upon a predetermined increase in brake cylinder pressure. It will here be noted that this final reduction in brake pipe pressure is at a slow rate, as governed by the choke 40 in the passage 39, so as to smooth out or dampen surges which may have been created in the fluid in the brake pipe.

It will be understood that, in some cases a triple valve device may be sensitive enough to move to service position during the venting of fluid from the brake pipe to the quick service reservoir and may even be so sensitive that it will move to service position upon the reduction in brake pipe pressure initiated through the medium of the brake valve device.

In graduating an application of the brakes, all quick service operation is ineffective after the initial stage of the application. In cycling operation, quick service venting of fluid under pressure from the brake pipe to the quick service reservoir 17 and to the brake cylinder occurs upon the initial reduction in brake pipe pressure. The pressure retained in the brake cylinder by the retaining valve device 2 is however adapted to render the quick service modifying valve device ineffective in a subsequent application of the brakes, so that the only quick service action which is effective after the initial application of the brakes in cycling is that effected by the quick service reservoir 17 and choke 18. Since the quick service reservoir 17 is at all times vented directly to the atmosphere through the choke 18, it will be evident that if, at any time or for any reason during the operation of the equipment, the triple valve device should fail to move from quick service position, the venting of fluid from the brake pipe to the quick service reservoir upon an increase in brake pipe pressure will not affect the pressure in the brake cylinder, but will merely be a leak from the brake pipe directly to the atmosphere, the rate of said leak being so restricted by choke 18, however, as to permit the brake pipe to be increased to effect a release of the brakes.

The subject matter relating to the control of the quick service venting of fluid from the brake pipe according to a predetermined brake cylinder pressure, and the feature of venting fluid from the brake pipe to a quick service reservoir and at the same time venting fluid from the brake pipe to the atmosphere, are both broadly claimed in an application of Clyde C. Farmer, Serial No. 612,465, filed May 20, 1932.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe and a quick service reservoir having a direct and always open atmospheric vent, of a brake controlling valve device having a quick service position for establishing a communication through which fluid under pressure is adapted to be vented from said brake pipe to said reservoir at a rapid rate and through said vent at a slower rate, and operative upon a reduction in brake pipe pressure effected at one or the other of said rates to effect an application of the brakes.

2. In a fluid pressure brake, the combination with a brake pipe and a quick service reservoir having a restricted connection always in open communication with the atmosphere, of a brake controlling valve device having a quick service position for effecting a rapid venting of fluid under pressure from said brake pipe to said reservoir, said restricted connection being adapted after substantial equalization of pressures in said brake pipe and reservoir to continue the reduction in brake pipe pressure at a slower rate, said brake controlling valve device being operative upon either said rapid venting or said slower rate of reduction in brake pipe pressure effected at either one or the other of said rates to effect an application of the brakes.

3. In a fluid pressure brake, the combination with a brake pipe and a quick service reservoir having an always open atmospheric vent, of a brake controlling valve device having a quick service position for venting fluid under pressure from said brake pipe to said resevoir at one rate and through said atmospheric vent at another rate, and operative upon a reduction in brake pipe pressure effected at either one or the other of said rates to effect an application of the brakes and to close communication through which fluid under pressure is vented from the brake pipe to said reservoir.

4. In a fluid pressure brake, the combination with a brake pipe and a quick service reservoir having an always open atmospheric vent, of a brake controlling valve device having a quick service position for establishing a communication through which fluid under pressure is vented from said brake pipe to said reservoir at one rate and through said atmospheric vent at another rate, and movable upon a reduction in brake pipe pressure effected at either one or the other of said rates to an application position to effect an application of the brakes and movable upon an increase in brake pipe pressure to a release position to effect a release of the brakes, said communication being closed in application and release positions.

5. In a fluid pressure brake, the combination with a brake pipe, and a quick service reservoir, of a brake controlling valve device for establishing communication through which fluid under pressure is vented from said brake pipe to said reservoir to effect a quick service reduction in brake pipe pressure and operative upon said quick service reduction in brake pipe pressure to close said communication and to effect an application of the brakes, said brake controlling valve device being operative upon an increase in brake pipe pressure to effect a release of the brakes and to maintain said communication closed, and means independent of said brake controlling valve device for venting fluid under pressure from said quick service reservoir.

6. In a fluid pressure brake, the combination with a brake pipe, a brake cylinder, an auxiliary reservoir and a quick service reservoir, of a triple valve device comprising a main valve, an auxiliary valve movable relative to said main valve and a piston subject to the opposing pressures of the brake pipe and auxiliary reservoir for moving said valves, said piston being operative to move said auxiliary valve relative to said main valve upon a light reduction in brake pipe pressure to vent fluid under pressure from said brake pipe to said quick service reservoir and operative upon venting of fluid under pressure to said reservoir to move said main valve for supplying fluid under pressure from said auxiliary reservoir to said brake cylinder and for closing communication from said brake pipe to said quick service reservoir, said piston being operative upon an increase in brake pipe pressure to move said valves to a position for releasing fluid under pressure from said brake cylinder and in which said communication is maintained closed, said quick service reservoir having an always open atmospheric vent, and a choke in said vent for controlling the release of fluid under pressure from said reservoir to the atmosphere.

7. In a fluid pressure brake, the combination with a brake pipe and a quick service reservoir, of a brake controlling valve device movable upon a light reduction in brake pipe pressure to a quick service position for venting fluid under pressure from said brake pipe to said quick service reservoir and movable upon the quick service reduction in brake pipe pressure to an application position for effecting an application of the brakes, said brake controlling valve device being movable upon an increase in brake pipe pressure to a release position for effecting a release of the brakes, communication to said quick service reservoir being closed in all positions of said brake controlling valve device except quick service position, said quick service reservoir having an always open atmospheric vent for releasing fluid under pressure therefrom.

8. In a fluid pressure brake, the combination with a brake pipe, of a brake cylinder, a communication through which fluid is released from the brake cylinder, a quick service reservoir, another communication, separate from the first mentioned communication, through which fluid is vented from the quick service reservoir, and a triple valve device comprising a piston, an auxiliary slide valve and a main slide valve, said piston being operative upon a reduction in brake pipe pressure to move said auxiliary slide valve relative to said main slide valve to a position for venting fluid under pressure from said brake pipe to said quick service reservoir for effecting a quick service reduction in brake pipe pressure and also operative upon a reduction in brake pipe pressure to supply fluid under pressure to said brake cylinder to effect an application of the brakes.

9. In a fluid pressure brake, the combination with a brake pipe, of a brake cylinder, a communication through which fluid is released from the brake cylinder, a quick service reservoir, a communication, entirely independent of the first mentioned communication, through which fluid is vented from the quick service reservoir, and a triple valve device comprising a piston, an auxiliary slide valve and a main slide valve, said piston being operative upon a reduction in brake pipe pressure to move said auxiliary slide valve relative to said main slide valve to a position for venting fluid under pressure from said brake pipe to said quick service reservoir for effecting a quick service reduction in brake pipe pressure and operative upon a further reduction in brake pipe pressure to move said main slide valve to a position for supplying fluid under pressure to said brake cylinder to effect an application of the brakes.

10. In a fluid pressure brake, the combination with a brake pipe, of a brake cylinder, a communication through which fluid is released from the brake cylinder, a quick service reservoir, a communication through which fluid is vented from the quick service reservoir, and a triple valve device for controlling only the first mentioned communication and operative upon a reduction in brake pipe pressure to close the first mentioned communication, to vent fluid under pressure from the brake pipe to said quick service reservoir for effecting a quick service reduction in brake pipe pressure, and to supply fluid under pressure to said brake cylinder to effect an application of the brakes.

11. In a fluid pressure brake, the combination with a brake pipe, a brake cylinder, and a quick service reservoir, of a triple valve device movable upon a light reduction in brake pipe pressure to a quick service position for venting fluid under pressure from said brake pipe to said quick service reservoir for effecting a preliminary quick service reduction in brake pipe pressure, said triple valve device being movable upon said preliminary quick service reduction in brake pipe pressure to an application position for supplying fluid under pressure to said brake cylinder for effecting an application of the brakes, and means operative after substantial equalization of brake pipe pressure into said quick service reservoir for continuing the reduction in brake pipe pressure by venting fluid under pressure from the quick service reservoir directly to the atmosphere at such a rate as to cause said triple valve device to move to application position if said triple valve device does not move to application position upon said preliminary quick service reduction in brake pipe pressure.

12. In a fluid pressure brake, the combination with a brake pipe, a brake cylinder, and a quick service reservoir, of a triple valve device movable upon a light reduction in brake pipe pressure to a quick service position for venting fluid under pressure from said brake pipe to said quick service reservoir at a rapid rate for effecting a preliminary quick service reduction in brake pipe pressure, said triple valve device being movable at one time upon said preliminary quick service reduction in brake pipe pressure to an application position for suplying fluid under pressure to said brake cylinder for applying the brakes, said quick service reservoir having an always open atmospheric vent for continuing the reduction in brake pipe pressure after substantial equalization of brake pipe pressure into said quick service reservoir for moving said triple valve device to application position if said triple valve device does not move to application position upon said preliminary quick service reduction in brake pipe pressure.

13. In a fluid pressure brake, the combination with a brake pipe, a brake cylinder, and a quick service reservoir, of a triple valve device movable upon a light reduction in brake pipe pressure to a quick service position for venting fluid under pressure from said brake pipe to said quick service reservoir for effecting a preliminary quick service reduction in brake pipe pressure, said triple valve device being movable upon said preliminary quick service reduction in brake pipe pressure to an application position for supplying fluid under pressure to said brake cylinder for effecting an application of the brakes, and means including an always open communication from the quick service reservoir to the atmosphere for venting fluid under pressure from said brake pipe to the atmosphere, after substantial equalization of fluid under pressure from the brake pipe into said quick service reservoir, at such a rate as to cause said triple valve device to move to application position, if said triple valve device does not move to application position upon said preliminary quick service reduction in brake pipe pressure.

14. In a fluid pressure brake, the combination with a brake pipe, a brake cylinder, and a quick service reservoir, of a triple valve device movable upon a light reduction in brake pipe pressure to a quick service position for venting fluid under pressure from said brake pipe to said quick service reservoir, for effecting a preliminary quick service reduction in brake pipe pressure, said triple valve device being movable upon said preliminary quick service reduction in brake pipe pressure to an application position for supplying fluid under pressure to said brake cylinder for effecting an application of the brakes, and means for venting fluid under pressure from said quick service reservoir directly to the atmosphere for continuing the quick service reduction in brake pipe pressure after substantial equalization of fluid under pressure from said brake pipe into said quick service reservoir, for ensuring movement of said triple valve device to application position in case said triple valve device does not move to application position upon said preliminary quick service reduction in brake pipe pressure.

15. In a fluid pressure brake, the combination with a brake pipe, a brake cylinder, and a quick service reservoir, of a triple valve device movable upon a light reduction in brake pipe pressure to a quick service position for venting fluid under pressure from said brake pipe to said quick service reservoir for effecting a preliminary quick service reduction in brake pipe pressure, said triple valve device being movable upon said preliminary quick service reduction in brake pipe pressure to an application position for supplying fluid under pressure to said brake cylinder for effecting an application of the brakes, and means operative after substantial equalization of brake pipe pressure into said quick service reservoir for continuing the reduction in brake pipe pressure by venting fluid under pressure from the quick service reservoir directly to the atmosphere at such a rate as to cause said triple valve device to move to application position if said triple valve device does not move to application position upon said preliminary quick service reduction in brake pipe pressure, said triple valve device being operative in application position to close the communication through which fluid under pressure is vented from the brake pipe to said quick service reservoir by the operation of said means.

16. In a fluid pressure brake, the combination with a brake pipe, a brake cylinder, and a quick service reservoir, of a triple valve device movable upon a light reduction in brake pipe pressure to a quick service position for venting fluid under pressure from said brake pipe to said quick service reservoir at a rapid rate for effecting a preliminary quick service reduction in brake pipe pressure, said triple valve device being movable at one time upon said preliminary quick service reduction in brake pipe pressure to an application position for supplying fluid under pressure to said brake cylinder for applying the brakes, said quick service reservoir having an always open atmospheric vent for continuing the reduction in brake pipe pressure after substantial equalization of brake pipe pressure into said quick service reservoir for moving said triple valve device to application position if said triple valve device does not move to application position upon said preliminary quick service reduction in brake pipe pressure, said triple valve device being operative in application position to close the communication through which fluid under pressure is vented from the brake pipe to said quick service reservoir.

17. In a fluid pressure brake, the combination with a brake pipe, a brake cylinder, and a quick service reservoir, of a triple valve device movable upon a light reduction in brake pipe pressure to a preliminary quick service position for venting fluid under pressure from said brake pipe to said quick service reservoir and movable upon a predetermined reduction in brake pipe pressure to an application position for supplying fluid under pressure to said brake cylinder for effecting an application of the brakes, said quick service reservoir being of such a volume that substantial equalization of pressures in the brake pipe and said quick service reservoir effects said predetermined reduction in brake pipe pressure when the volume of the brake pipe on a car is the minimum employed, and means for continuing the quick service reduction in brake pipe pressure after said substantial equalization at such a rate as to effect said predetermined reduction in brake pipe pressure on a car where the volume of the brake pipe carried by said car exceeds the minimum brake pipe volume employed on cars.

18. A fluid pressure brake system for a train of cars, the fluid pressure brake equipment on each car of the train comprising, in combination with a brake pipe connected throughout the train, a brake cylinder, a quick service reservoir and a triple valve device movable upon a light reduction in brake pipe pressure to a preliminary quick service position for venting fluid under pressure from said brake pipe to said quick service reservoir, the substantial equalization of brake pipe into said quick service reservoir being adapted to propagate quick service action from car to car serially throughout the train, said triple valve device being movable upon a predetermined reduction in brake pipe pressure from preliminary quick service position to an application position for supplying fluid under pressure to said brake cylinder for applying the brakes, the volume of said quick service reservoir bearing such a relation to the brake pipe on a car carrying a brake pipe of minimum volume that said predetermined reduction is obtained upon said substantial equalization of pressures in the brake pipe and said reservoir, and means for continuing the reduction in brake pipe pressure, after said substantial equalization, at such a rate as to obtain said predetermined reduction in brake pipe pressure on a car where the volume of the brake pipe on a car exceeds the minimum.

19. In a fluid pressure brake, the combination with a brake pipe, of a triple valve device movable upon a reduction in brake pipe pressure to a quick service position for venting fluid under pressure from said brake pipe to the atmosphere for effecting a quick service reduction in brake pipe pressure and movable upon an increase in brake pipe pressure to a brake releasing position, and means operable in the quick service position for restricting the quick service venting of fluid from the brake pipe to a rate less than the minimum rate at which the brake pipe pressure is increased in effecting a release of the brakes.

20. In a fluid pressure brake, the combination with a brake pipe, and a quick service reservoir, of a brake controlling valve device for establishing communication through which fluid under pressure is vented from said brake pipe to said reservoir to effect a quick service reduction in brake pipe pressure and operative upon said quick service reduction in brake pipe pressure to effect an application of the brakes, and means independent of said brake controlling valve device for venting fluid under pressure from said quick service reservoir when said brake controlling valve device is effecting an application of the brakes.

21. In a fluid pressure brake, the combination with a brake pipe, and a quick service reservoir, of a brake controlling valve device for establishing communication through which fluid under pressure is vented from said brake pipe to said reservoir to effect a quick service reduction in brake pipe pressure and operative upon said quick service reduction in brake pipe pressure to effect an application of the brakes, said brake controlling valve device being operative upon an increase in brake pipe pressure to effect a release of the brakes, and means independent of said brake controlling valve device for releasing fluid under pressure from said quick service reservoir.

22. In a fluid pressure brake, the combination with a brake pipe, a brake cylinder, an auxiliary reservoir and a quick service reservoir, of a triple valve device comprising a main valve, an auxiliary valve movable relative to said main valve and a piston subject to the opposing pressures of the brake pipe and auxiliary reservoir for moving said valves, said piston being operative to move said auxiliary valve relative to said main valve upon a light reduction in brake pipe pressure to vent fluid under pressure from said brake pipe to said quick service reservoir and operative upon venting of fluid under pressure to said reservoir to move said main valve for supplying fluid under pressure from said auxiliary reservoir to said brake cylinder and for closing communication from said brake pipe to said quick service reservoir, said quick service reservoir having an always open restricted communication with the atmosphere through which fluid is vented from said reservoir to the atmosphere.

23. In a fluid pressure brake, the combination with a brake pipe and a quick service reservoir, of a brake controlling valve device movable upon a light reduction in brake pipe pressure to a quick service position for venting fluid under pressure from said brake pipe to said quick service reservoir and movable upon the quick service reduction in brake pipe pressure to an application position for effecting an application of the brakes, said quick service reservoir having a direct and always open atmospheric vent for releasing fluid under pressure from said reservoir.

24. In a fluid pressure brake, the combination with a brake pipe and a quick service reservoir, of a brake controlling valve device movable upon a light reduction in brake pipe pressure to a quick service position for venting fluid under pressure from said brake pipe to said quick service reservoir and movable upon the quick service reduction in brake pipe pressure to an application position for effecting an application of the brakes and for closing communication from said brake pipe to said quick service reservoir, said quick service reservoir having an always open atmospheric vent for releasing fluid under pressure from said reservoir.

25. In a fluid pressure brake, the combination with a brake pipe and a quick service reservoir, of a triple valve device movable upon a reduction in brake pipe pressure to a quick service position for venting fluid under pressure from said brake pipe to said quick service reservoir at a rapid rate, said triple valve device being movable upon an increase in brake pipe pressure to a brake releasing position, said quick service reservoir having an opening leading directly to the atmosphere, and a choke in said opening for limiting the rate of venting of fluid from said reservoir to a rate less than the minimum rate at which brake pipe pressure is increased in effecting a release of the brakes.

26. In a fluid pressure brake, in combination, a brake pipe, a brake controlling valve device movable upon a reduction in brake pipe pressure to a quick service position for venting fluid under pressure from the brake pipe for effecting a quick service reduction in brake pipe pressure to effect movement of said brake controlling valve device to a brake applying position, said brake controlling valve device being movable upon an increase in brake pipe pressure to a brake releasing position, and means for restricting said venting of fluid under pressure from the brake pipe to permit the brake pipe pressure to be increased when, in effecting a release of the brakes, the brake controlling valve device is unintentionally in quick service position.

27. In a fluid pressure brake, in combination, a brake pipe, a brake controlling valve device movable upon a reduction in brake pipe pressure first to a quick service position and then to an application position and movable upon an increase in brake pipe pressure to a release position, means operative in the quick service position of said brake controlling valve device for effecting quick service venting of fluid under pressure from said brake pipe for effecting movement of said brake controlling valve device to said application position, and means operative to restrict the venting of fluid from the brake pipe to permit the brake pipe pressure to be increased when, in effecting a release of the brakes, the brake controlling valve device is unintentionally in quick service position.

28. In a fluid pressure brake, in combination, a brake pipe, a brake controlling valve device movable upon a reduction in brake pipe pressure first to a quick service position and then to an application position and movable upon an increase in brake pipe pressure to a release position, means operative in the quick service position of said brake controlling valve device for effecting quick service venting of fluid under pressure from said brake pipe at a rapid rate to effect movement of said brake controlling valve device to application position, and means operative to restrict the rate of venting of fluid under pressure from the brake pipe to permit the brake pipe pressure to be increased, if, in releasing the brakes, the brake controlling valve device should be in quick service position.

29. In a fluid pressure brake, in combination, a brake pipe, a brake cylinder, a brake controlling valve device movable upon a reduction in brake pipe pressure to a quick service position for effecting a quick service reduction in brake pipe pressure, said brake controlling valve device being movable upon said quick service reduction in brake pipe pressure to an application position for supplying fluid under pressure to said brake cylinder for effecting an application of the brakes and being movable upon an increase in brake pipe pressure to a release position for releasing fluid under pressure for effecting a release of the brakes, said quick service venting of fluid under pressure from said brake pipe being independent of the pressure of fluid in said brake cylinder; and means for restricting the rate at which fluid under pressure is vented from the brake pipe in said quick service position to a degree less than the rate of increase in brake pipe pressure in effecting a release of the brakes so as to ensure an increase in brake pipe pressure if, upon initiating a release of brakes, the brake controlling valve device should unintentionally be in quick service position.

30. In a fluid pressure brake, in combination, a brake pipe, a brake controlling valve device movable upon a reduction in brake pipe pressure to a quick service position for venting fluid under pressure from said brake pipe directly to the atmosphere in effecting a quick service reduction in brake pipe pressure, said brake controlling valve device being movable upon said quick service reduction in brake pipe pressure to a brake application position and upon an increase in brake pipe pressure to a brake release position, and means for restricting the venting of fluid under pressure from said brake pipe to the atmosphere in said quick service position to a rate which will ensure an increase in brake pipe pressure being obtained in case said brake controlling valve device is in quick service position when the brake pipe pressure is increased to effect the release of the brakes.

31. In a fluid pressure brake, in combination, a brake pipe, a quick service reservoir, a brake controlling valve device movable upon a reduction in brake pipe pressure to a quick service position for venting fluid under pressure from said brake pipe to said reservoir at a rapid rate for effecting a quick service reduction in brake pipe pressure, said brake controlling valve device being movable upon said quick service reduction in brake pipe pressure to a brake application position for applying the brakes, and being movable upon an increase in brake pipe pressure to a brake release position for releasing brakes, and means for restricting the venting of fluid under pressure from said brake pipe to said reservoir to a rate which will ensure an increase in brake pipe pressure being obtained, when in effecting a release of brakes, said brake controlling valve device is in said quick service position.

32. In a fluid pressure brake, in combination, a brake pipe, a quick service reservoir, a brake controlling valve device movable upon a reduction in brake pipe pressure to a quick service position for venting fluid under pressure from said brake pipe to said reservoir at a rapid rate for effecting a quick service reduction in brake pipe pressure, said brake controlling valve device being movable upon said quick service reduction in brake pipe pressure to a brake application position for applying the brakes, and being movable upon an increase in brake pipe pressure to a brake release position for releasing brakes, said quick service reservoir having an always open vent to the atmosphere, and means in said vent adapted to restrict the flow of fluid under pressure from said brake pipe, to a rate which will ensure an increase in brake pipe pressure being obtained if said brake controlling valve device should be in said quick service position when the brake pipe pressure is increased to initiate a release of the brakes.

33. In a fluid pressure brake, the combination with a brake pipe, of a quick service reservoir of a volume which is so limited as to permit equalization of the brake pipe into said reservoir at a rapid rate without causing an emergency rate of reduction in brake pipe pressure of such duration as to cause an emergency operation, said reservoir having an always open restricted connection with the atmosphere of a size to permit continued venting of fluid from the brake pipe at a service rate, and a brake controlling valve device having a quick service position for venting fluid under pressure from said brake pipe to said reservoir at a rapid rate and operative upon a reduction in brake pipe pressure to effect an application of the brakes.

CLAUDE A. NELSON.